C. B. POST.
STEERING MECHANISM.
APPLICATION FILED MAR. 21, 1919.
1,405,435.
Patented Feb. 7, 1922.
2 SHEETS—SHEET 2.
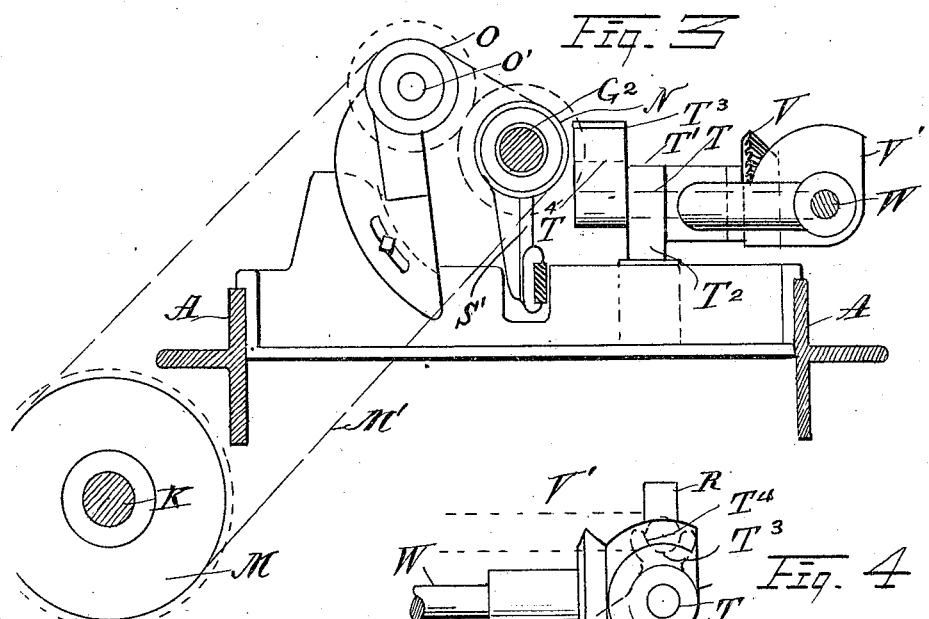
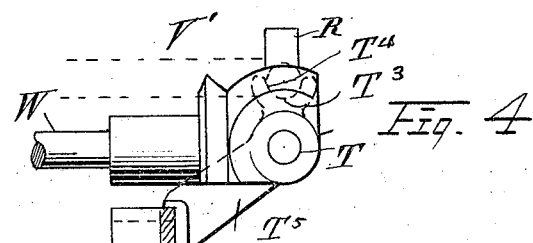
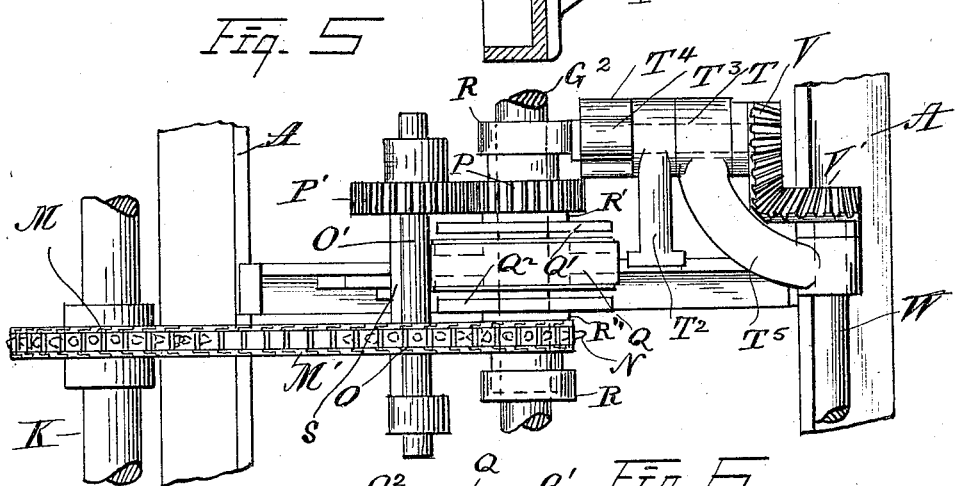
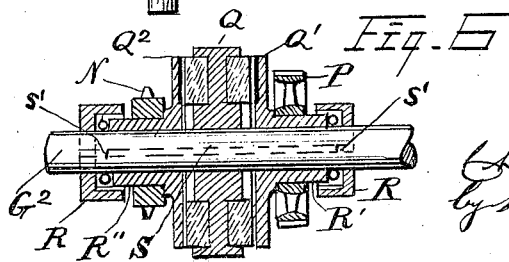

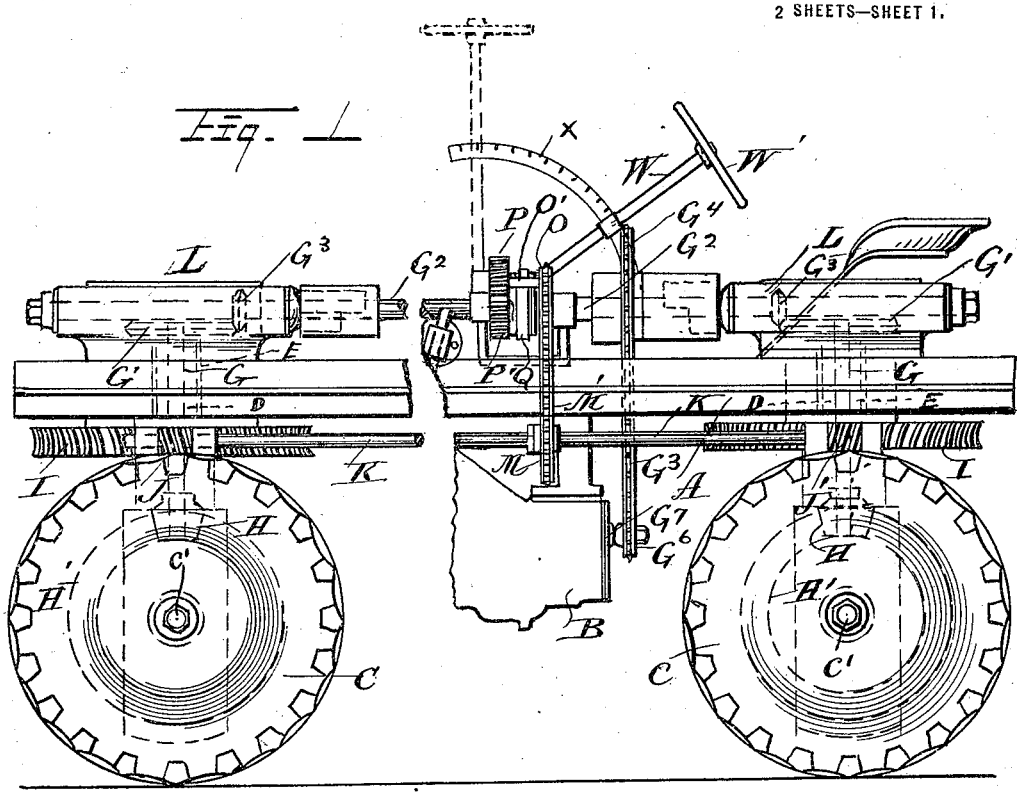

UNITED STATES PATENT OFFICE.

CHARLES B. POST, OF NEW LONDON, OHIO.

STEERING MECHANISM.

1,405,435.      Specification of Letters Patent.    Patented Feb. 7, 1922.

Original application filed January 2, 1919, Serial No. 269,200. Divided and this application filed March 21, 1919. Serial No. 283,979.

*To all whom it may concern:*

Be it known that I, CHARLES B. POST, a citizen of the United States, and resident of New London, in the county of Huron and State of Ohio, have invented certain new and useful Improvements in Steering Mechanism, of which I hereby declare the following to be a full, clear, and exact description, such as will enable others skilled in the art to which it appertains to make and use the same.

The objects of the invention are to provide an improved form of reversible steering mechanism for a tractor and particularly adapted for use in a motor driven tractor provided with a power operated traction wheel at each extremity of an elongated frame, and in which the traction wheels are revolvable upon vertical trunnions or axes and controlled by means of a common connecting means or shaft to follow a common track as the machine is guided over the ground.

The invention includes the steering mechanism disclosed in the application for Letters Patent Serial No. 269,200 filed Jan. 2nd, 1919, for a tractor in which the traction wheels at each end are propelled by means of a common longitudinal motor shaft, and are rotated upon vertical axes, by means of a common parallel shaft and operating gearing, of which application this application is a division, although the same steering mechanism is applicable to other types of machines in which separate driving and steering shafts are employed, and in which the members to be operated are rotatable on both vertical and horizontal axes.

The invention comprises the forms of construction and combination and arrangement of parts hereinafter more fully described, shown in the accompanying drawings, and specifically pointed out in the claims.

In the accompanying drawings, Fig. 1 is a side elevation of a tractor embodying my invention; Fig. 2 is a plan thereof; Fig. 3 is a transverse section enlarged of the frame of the machine showing the driving and steering shafts and operating means for the steering shaft; Fig. 4 is an elevation of the gears which operate the clutch device; Fig. 5 is a plan of the steering device; Fig. 6 is a longitudinal vertical section of the clutch members, showing alternate use of driving gears and sprocket wheels.

In these views, A is an elongated frame in which divided wheels C, C, at each end are mounted upon horizontal axles C' C' which in turn are secured to vertical trunnions D, D, in bearings E, F, upon the extremities of the frame A.

The wheels are rotated upon their axles by means of the common drive shaft $G^2$ and intermediate gearing $G^1$, $G^3$, shafts G and gears H and H' on one of the wheel divisions, as shown in copending Serial No. 225,940, filed April 1, 1915. K is the steering shaft common to both wheels which is employed for rotating the trunnions in opposite directions to cause the wheel to follow a common track.

Means for operatively connecting the steering shaft and trunnions are shown as horizontal worm gears I, I, on the trunnions and worms J', J', upon the steering shafts, the worms and wheels having right and left hand teeth respectively.

The main driving shaft is rotated by means of a sprocket chain $G^5$, a sprocket wheel $G^4$ on the shaft $G^2$ and a sprocket $G^6$ upon the shaft of the motor B. Upon the driving shaft $G^2$ are shown a sprocket wheel N and a spur gear P, mounted loosely thereon and by means of these members the steering shaft is rotated alternately in opposite directions. This is accomplished in the following manner:

At O' is a counter shaft, upon which are fixed a spur gear P' engaging the gear P, and a sprocket wheel O over which and over the sprocket N, a chain M' passes. This chain rotates the sprocket wheel M upon the steering shaft in one direction or the other as the counter shaft is rotated alternately by means of the gear P and the sprocket wheel N. To alternately engage the gear P and sprocket wheel N with the shaft $G^2$, an intermediate clutch member Q is fixed upon the shaft, and slidable discs or clutch members $Q^1$ $Q^2$ are affixed to the sleeves $R^1$ $R^2$ bearing the gear P and sprocket N respectively, which slide upon the shaft $G^2$.

These clutch discs are alternately moved to engage with the intermediate clutch members Q by means of the cap sleeves R—R which contain friction rollers or balls $R^3$, $R^3$, and are rigidly connected together by means of the bar S and arms S', S', so that as one clutch member engages the intermediate clutch, the other will be released therefrom.

The bar S is swung from one position to the other by means of the cam or fork T⁴ upon a shaft T at right angles to the shaft G² which engages a pin T³ upon one of the cap sleeves R. This shaft T is conveniently rotated by means of the bevel gears V, V' and shaft W upon which a steering wheel W' is secured.

The shaft W and gear V' are pivotally mounted upon the shaft T by means of the curved bearing member T⁵ thus permitting the steering shaft W to be elevated to a vertical position and permitting reins to be attached thereto when the operator is riding upon a machine or vehicle drawn behind the tractor. An arc X permits adjustment of the angle of elevation of the shaft W.

Having described the invention what I claim as new and desire to secure by Letters Patent is:—

1. In a steering device in combination, parallel drive and steering shafts, a clutch member rigidly fixed upon the drive shaft, a slidable clutch member upon each side thereof, drive mechanism for said steering shaft, alternately connectible with said slidable clutch members to drive said steering shaft in opposite directions, a reciprocating member for operating said clutch members, a steering rod and means for operatively connecting said steering rod and said reciprocatable clutch operating means.

2. In a steering device, the combination with parallel drive and steering shafts and an intermediate shaft, of alined sprockets upon said shafts and a sprocket chain therefor, engaging spur gearing upon said drive and counter shafts, the gear and sprocket upon the drive shaft being loose thereon, an intermediate clutch member upon said drive shaft, and complementary clutch members slidable upon said drive shaft with said loose gear and sprocket.

3. In a steering device, in combination, parallel drive and steering shafts, a clutch member fixed on said drive shaft, a slidable clutch member upon each side thereof, drive mechanism for said steering shaft alternately connectible with said slidable clutch member, to drive said steering shaft in opposite directions, a reciprocating member for operating said slidable clutch member, a shaft at right angles to said main shaft, eccentric engaging means thereon for said reciprocating member, a steering rod and gearing operatively connecting said steering rod and eccentric bearing shaft.

4. In a tractor, a main driving shaft, a steering shaft, and a counter shaft, a sprocket wheel on each shaft; the sprocket on said main shaft being loose, a common chain therefor, a loose gear on said main shaft and a corresponding fixed gear on said counter shaft, and clutch mechanism on said main shaft with which said loose gear and loose sprocket wheel simultaneously move to alternately engage and means for operating said loose gear and sprocket wheel.

5. In a steering device, parallel driving and steering shafts, a clutch member fixed upon said driving shaft, a movable clutch member on each side of said fixed member, means for rotating said steering shaft in opposite directions, said means operatively and respectively connected with said movable clutch members to alternately engage with said fixed clutch members, an operating means for said clutch member moving device, and a steering rod operatively connected with said operating means.

6. In a steering device, parallel driving and steering shafts, a clutch member fixed on said driving shaft, a slidable clutch member on each side thereof, reversible drive mechanism for said steering shaft alternately connectible with said slidable clutch members to drive said steering shaft in opposite directions, a reciprocatable member for operating said slidable clutch members, a shaft at right angles to said main shaft, means upon said shaft for operating said reciprocatable member, a steering rod at an angle to said last named shaft, a bearing member for said rod, reciprocatable about said last named shaft, and gearing operatively connecting said last named shaft and rod.

7. In a steering device, in combination, a drive shaft and a parallel steering shaft, an intermediate counter shaft, aligned sprockets upon said shafts and a common sprocket chain therefor, engaging spur gears upon said drive shaft and counter-shaft, said sprocket wheel and gear on said drive shaft being loose thereon; a fixed clutch member on said drive shaft intermediate of said loose sprocket and gear, a movable clutch member each for said loose gear and sprocket, and cap sleeves engaging said loose sprocket and gear respectively, said cap sleeves rigidly connected together, friction end bearings in said cap sleeves for said loose sprocket and gear respectively, and means for moving said cap sleeves longitudinally upon said drive shaft to alternately engage said movable clutch members with said fixed clutch member.

8. In a steering device, a clutch operating shaft, a steering rod at an angle thereto, operating means connecting said shafts and rod, and a bearing member for said rod, said bearing member pivoted on said clutch operating shaft and movable thereabout.

In testimony whereof, I hereunto set my hand this 22 day of February, 1919.

CHARLES B. POST.

In presence of—
S. W. SANGSTER.